United States Patent Office 2,827,455
Patented Mar. 18, 1958

2,827,455

PRODUCTION OF LOWER ALIPHATIC ACID ESTER OF CELLULOSE FROM WOOD PULP

Robert H. Wells, Union, and Blanche B. White, Summit, N. J., assignors to Celanese Corporation of America, New York, N. Y., a corporation of Delaware No Drawing. Application July 15, 1955
Serial No. 522,383

10 Claims. (Cl. 260—229)

This invention relates to the production of organic acid esters of cellulose and relates more particularly to an improved process for the production of organic acid esters of cellulose from wood pulp cellulose by the homogeneous or solution process.

In the production of organic acid esters of cellulose by the homogeneous or solution process, cellulose may be esterified with an organic acid anhydride in the presence of a solvent for the cellulose ester being formed whereby there will be obtained at the completion of the esterification a solution of the organic acid ester of cellulose. There are two classes of solvent employed for this process. One class comprises the water-miscible solvents such as acetic acid; the other class being the water-immiscible solvents such as methylene chloride.

Prior to carrying out the esterification, the cellulose is pretreated, for example, with acetic acid, to increase its reactivity and thereby shorten the esterification time. It has long been recognized that wood pulp cellulose is somewhat more resistant to pretreatment than is cellulose derived from cotton linters but when properly pretreated is more reactive in the acetylation in acetic acid or other water-miscible solvent. However, when the esterification is carried out using methylene chloride or other water-immiscible solvents for the organic acid ester of cellulose, the time required for the esterification of wood pulp cellulose becomes much greater than that required for the esterification of cellulose from cotton linters when conventional pretreatment procedures are used. In point of fact, in certain cases the wood pulp cellulose does not esterify completely, producing a dope that has present therein appreciable amounts of unesterified or incompletely esterified cellulose. As a result, there obtains in this process a serious problem of efficient utilization of the wood pulp cellulose.

It is an important object of this invention to provide a process for the production of organic acid esters of cellulose which will be free from the foregoing and other difficulties.

A further object of this invention is to provide a process for the production of organic acid esters of cellulose from wood pulp cellulose in which there will be a rapid and complete esterification of the wood pulp cellulose.

Other objects of this invention will be apparent from the following detailed description and claims.

According to the present invention, wood pulp cellulose, which contains a small proportion of water, is pretreated by contacting the same with a lower aliphatic acid. Then, there is brought into contact with the said cellulose a quantity of lower aliphatic acid anhydride sufficient to react with all the water therein in the presence of a substance that will catalyze the reaction between the water and the lower aliphatic acid anhydride. The pretreated cellulose is then esterified with an organic acid anhydride in the presence of methylene chloride or other water-immiscible solvent for the organic acid ester of cellulose being formed. When the pretreatment is carried out in this way, it is found that the esterification proceeds rapidly to completion, yielding a dope that is relatively free from unesterified particles.

The process of this invention is applicable generally to wood pulps of high purity, commonly known as acetylation pulps, produced by the sulfite, sulfate or other known processes for obtaining cellulose from wood and similar lignocellulosic materials. This wood pulp cellulose will have present therein an amount of water ranging from a minimum of about 4% by weight to about 10%, or, in some cases, more, based on the bone-dry weight of the cellulose. The water in the wood pulp cellulose may have been added thereto, or may be the water left in the said cellulose during its manufacture and also may be the water that is, under certain conditions, picked up by the cellulose from the atmosphere. The wood pulp cellulose may be pretreated in the form of sheets, or wide bands of indefinite length unwound from the rolls into which form wood pulp cellulose is frequently taken up during its manufacture. The wood pulp cellulose may also be pretreated in the form of a mass of individual fibres prepared, for example, by shredding said rolls or sheets.

The water-containing wood pulp cellulose is contacted with a lower aliphatic acid, for example, acetic acid, which is preferred, formic acid, propionic acid, butyric acid, or mixtures thereof. The amount of such acid may be between about 30 and 100% by weight or preferably between about 30 and 50% by weight, based on the bone dry weight of the cellulose. The pretreating acid should be distributed uniformly throughout the cellulose. A minimum time of at least about 10 minutes should be allowed for this stage of the pretreatment to insure a thorough penetration of the lower aliphatic acid into the cellulose. Otherwise, an adequate pretreatment of the cellulose may not be obtained. The temperature during this stage of the pretreatment may be room temperature, but reduced or elevated temperatures may also be employed.

The wood pulp cellulose is then further pretreated by contacting the same with a lower aliphatic acid anhydride in an amount at least sufficient to react with all the water present in the cellulose. Examples of suitable lower aliphatic acid anhydrides that may be employed for this purpose are acetic anhydride, propionic anhydride and butyric anhydride, as well as mixtures thereof. The lower aliphatic acid anhydride should be distributed uniformly throughout the wood pulp cellulose to react with all the water present therein. There is also present during this stage of the pretreatment a strong mineral acid or other substance that will catalyze the reaction between the anhydride and the water, such as sulfuric acid, perchloric acid, toluene sulfonic acid, ferric chloride and the like. In the absence of such a catalyst, it is difficult to obtain a complete reaction between the water and the lower aliphatic acid anhydride in all parts of the wood pulp cellulose. As a result, it is not possible to obtain a pretreated wood pulp cellulose that is highly reactive throughout. Good results have been obtained when there is employed between about 0.05 and 1.5% by weight of the catalyst, based on the bone dry weight of the cellulose. The duration of this stage of the pretreatment should be at least sufficient to permit all the water in the wood pulp cellulose to react with the lower aliphatic acid anhydride. When the quantities of water, catalyst, etc. are within the ranges specified above, it is found that good results are obtained with a minimum duration of about 5 minutes during this stage of the pretreatment. The cellulose and the pretreating agents may be at room temperature, or at reduced or elevated temperatures.

The pretreated cellulose is then esterified in a manner known in the art with a mixture containing an organic acid anhydride, as the esterifying agent, and methylene chloride or other water-immiscible solvent for the ester being formed. Examples of other water-immiscible solvents are chloroform, ethylene chloride and tetrachlorethane. For each 100 parts by weight of bone dry cellulose there may be employed between about 2.0 and 14.0 moles of the organic acid anhydride and between about 450 and 4500 parts by weight of solvent. In addition, there is present during the esterification an esterification catalyst such as sulfuric acid, perchloric acid, toluene sulfonic acid or ferric chloride preferably in amounts ranging between about 0.1 and 10% by weight based on the bone dry weight of the cellulose. The same substance may be used both to catalyze the reaction between the anhydride and the water and as the esterification catalyst. When this is done, the entire quantity of such substance may be added to the wood pulp cellulose during the pretreatment thereof, or a portion of this substance may be used during the pretreatment step and the remainder of the required quantity added to the cellulose during the esterification step.

The esterification of the wood pulp cellulose that has been pretreated in accordance with this invention proceeds rapidly to yield a dope containing a minimum of unesterified or incompletely esterified fibers. Surprisingly enough, when the pretreatment process of this invention is applied to cellulose derived from cotton linters, no advantages accrue as compared with the pretreatment of the cotton linters cellulose with a lower aliphatic acid alone. In both cases, the esterification of the pretreated cotton linters cellulose is completed in about the same period of time to yield a dope of equal clarity.

The process of this invention will now be described specifically in connection with the production of cellulose acetate which is commercially the most important organic acid ester of cellulose at the present time. It may, however, also be employed for the production of other organic acid esters of cellulose, including, for example, cellulose propionate, cellulose butyrate, cellulose acetate formate, cellulose acetate propionate, cellulose acetate butyrate, and cellulose benzoate.

The following examples are given to illustrate this invention further.

Example I

Acetylation grade wood pulp cellulose prepared by the sulfite process, having an alpha cellulose content of 95% and containing 7% by weight of water is stirred for 20 minutes at 25° C. with 35% by weight of glacial acetic acid based on the weight of the bone dry cellulose. The wood pulp cellulose is then stirred for 10 minutes at 25° C. with, for each 100 parts by weight of bone dry cellulose, a mixture containing 40 parts by weight of acetic anhydride, 1 part by weight of sulfuric acid and 20 parts by weight of acetic acid. The pretreated cellulose is then esterified with a mixture containing, for each 100 parts by weight of bone dry cellulose, 680 parts by weight of acetic anhydride, 4100 parts by weight of methylene chloride and 1.5 parts by weight of perchloric acid. The esterification is complete in between 9 and 10 minutes as evidenced by the clearing of the dope.

When the sulfuric acid is omitted from the pretreating solution, the time required for the completion of the esterification rises to between 19 and 21 minutes. When the pretreatment with the anhydride is omitted completely, the esterification time rises to between 25 and 40 minutes and there is obtained a cloudy dope indicating that not all the cellulose has been esterified.

Example II

Wood pulp cellulose as described in Example I is stirred for 10 minutes at 45° C. with 35% by weight of glacial acetic acid based on the weight of the bone dry cellulose. The wood pulp cellulose is stirred for 5 minutes at 45° C. with a mixture containing, for each 100 parts by weight of bone dry cellulose, 50 parts by weight of acetic anhydride, 50 parts by weight of acetic acid and 0.055 part by weight of perchloric acid. The pretreated cellulose is then esterified with a mixture containing, for each 100 parts by weight of bone dry cellulose, 680 parts by weight of acetic anhydride, 4100 parts by weight of methylene chloride and 0.58 part by weight of perchloric acid. The esterification is complete in 7.5 minutes as evidenced by the clearing of the dope.

In the claims all the percentages are based on the weight of the bone dry cellulose.

It is to be understood that the foregoing detailed description is merely given by way of illustration and that many variations may be made therein without departing from the spirit of our invention.

Having described our invention, what we desire to secure by Letters Patent is:

1. Process for the production of lower aliphatic acid esters of cellulose, which comprises contacting water-containing wood pulp cellulose with a lower aliphatic acid, then contacting the said cellulose with a lower aliphatic acid anhydride in an amount sufficient to react with all the water therein in the presence of a substance that will catalyze the reaction between the anhydride and the water, and esterifying the cellulose with a mixture containing a lower aliphatic acid anhydride and a water-immiscible solvent for the ester being formed.

2. Process for the production of lower aliphatic acid esters of cellulose, which comprises contacting water-containing wood pulp cellulose with a lower aliphatic acid, then contacting the said cellulose with a lower aliphatic acid anhydride in an amount sufficient to react with all the water therein in the presence of a mineral acid catalyst for the reaction between the anhydride and the water, and esterifying the cellulose with a mixture containing a lower aliphatic acid anhydride and a water-immiscible solvent for the ester being formed.

3. Process for the production of lower aliphatic acid esters of cellulose, which comprises contacting wood pulp cellulose containing between about 4 and 10% by weight of water with between about 30 and 100% by weight of a lower aliphatic acid, then contacting the said cellulose with a lower aliphatic acid anhydride in an amount sufficient to react with all the water therein in the presence of between about 0.05 and 1.5% by weight of a substance that will catalyze the reaction between the anhydride and the water, and esterifying the cellulose with a mixture containing a lower aliphatic acid anhydride and a water-immiscible solvent for the ester being formed.

4. Process for the production of cellulose acetate, which comprises contacting water-containing wood pulp cellulose with a lower aliphatic acid, then contacting the said cellulose with a lower aliphatic acid anhydride in an amount sufficient to react with all the water therein in the presence of a substance that will catalyze the reaction between the anhydride and the water, and esterifying the cellulose with a mixture containing acetic anhydride and water-immiscible solvent for the ester being formed.

5. Process for the production of cellulose acetate, which comprises contacting water-containing wood pulp cellulose with a lower aliphatic acid, then contacting the said cellulose with a lower aliphatic acid anhydride in an amount sufficient to react with all the water therein in the presence of a substance that will catalyze the reaction between the anhydride and the water, and esterifying the cellulose with a mixture containing acetic anhydride and methylene chloride.

6. Process for the production of cellulose acetate, which comprises contacting water-containing wood pulp cellulose with acetic acid, then contacting the said cellulose with acetic anhydride in an amount sufficient to react with all the water therein in the presence of a substance that will catalyze the reaction between the anhydride and the water, and esterifying the cellulose with a mixture containing acetic anhydride and a water-immiscible solvent for the ester being formed.

7. Process for the production of cellulose acetate, which comprises contacting water-containing wood pulp cellulose with acetic acid, then contacting the said cellulose with acetic anhydride in an amount sufficient to react with all the water therein in the presence of a substance that will catalyze the reaction between the anhydride and the water, and esterifying the cellulose with a mixture containing acetic anhydride and methylene chloride.

8. Process for the production of cellulose acetate, which comprises contacting the water-containing wood pulp cellulose with between about 30 and 100% by weight of acetic acid, then contacting the said cellulose with acetic anhydride in an amount sufficient to react with all the water therein in the presence of between about 0.05 and 1.5% by weight of a substance that will catalyze the reaction between the anhydride and the water, and esterifying the cellulose with a mixture containing acetic anhydride and methylene chloride.

9. Process for the production of cellulose acetate, which comprises contacting water-containing wood pulp cellulose with between about 30 and 100% by weight of acetic acid, then contacting the said cellulose with acetic anhydride in an amount sufficient to react with all the water therein in the presence of between about 0.05 and 1.5% by weight of a mineral acid catalyst for the reaction between the anhydride and the water, and esterifying the cellulose with a mixture containing acetic anhydride and methylene chloride.

10. Process for the production of cellulose acetate, which comprises contacting wood pulp cellulose containing between about 4 and 10% by weight of water with between about 30 and 50% by weight of acetic acid, then contacting the said cellulose with acetic anhydride in an amount sufficient to react with all the water therein in the presence of between about 0.05 and 1.5% by weight of a mineral acid catalyst for the reaction between the anhydride and the water, and esterifying the cellulose with a mixture containing acetic anhydride and methylene chloride.

References Cited in the file of this patent
UNITED STATES PATENTS

| | | |
|---|---|---|
| 2,126,190 | Hofmann | Aug. 9, 1938 |
| 2,607,771 | Groombridge et al. | Aug. 19, 1952 |
| 2,635,098 | Cane et al. | Apr. 14, 1953 |